US012278438B2

(12) United States Patent
Li et al.

(10) Patent No.: US 12,278,438 B2
(45) Date of Patent: Apr. 15, 2025

(54) ELECTRONIC DEVICE

(71) Applicant: VIVO MOBILE COMMUNICATION CO., LTD., Dongguan (CN)

(72) Inventors: Rihui Li, Dongguan (CN); Shenglu Zhang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 150 days.

(21) Appl. No.: 17/851,008

(22) Filed: Jun. 27, 2022

(65) Prior Publication Data

US 2022/0368017 A1 Nov. 17, 2022

Related U.S. Application Data

(63) Continuation of application No. PCT/CN2020/139906, filed on Dec. 28, 2020.

(30) Foreign Application Priority Data

Dec. 31, 2019 (CN) ........................ 201911417159.2

(51) Int. Cl.
*H01Q 5/30* (2015.01)
*H01Q 5/328* (2015.01)
(Continued)

(52) U.S. Cl.
CPC ............. *H01Q 9/285* (2013.01); *H01Q 5/328* (2015.01); *H01Q 7/00* (2013.01)

(58) Field of Classification Search
CPC .. H01Q 5/30; H01Q 5/328; H01Q 5/378-392; H01Q 1/243
See application file for complete search history.

(56) References Cited

U.S. PATENT DOCUMENTS 9,160,058 B2 10/2015 Tsou et al.
9,711,858 B1 * 7/2017 Lee ......................... H01Q 9/06
(Continued)

FOREIGN PATENT DOCUMENTS

CN 104319478 A 1/2015
CN 107275755 A 10/2017
(Continued)

OTHER PUBLICATIONS

International Search Report issued in corresponding International Application No. PCT/CN2020/139906, mailed Mar. 25, 2021, 4 pages.

(Continued)

*Primary Examiner* — Hasan Islam
(74) *Attorney, Agent, or Firm* — IPX PLLC

(57) ABSTRACT

An electronic device is provided. The electronic device includes a housing including a frame, an electromagnetic component, a ground plate disposed inside the housing, a first radiating body disposed inside the housing, and a second radiating body disposed at a distance from the first radiating body. The first radiating body is provided with a feeding point. A distance between the second radiating body and a first frame of the frame is less than a distance between the first radiating body and the first frame. A minimum distance between the first radiating body and the electromagnetic component is greater than a minimum distance between the second radiating body and the electromagnetic component, or a size of a projection area of the first radiating body onto the ground plate is larger than a preset size.

10 Claims, 5 Drawing Sheets

(51) Int. Cl.
*H01Q 7/00* (2006.01)
*H01Q 9/28* (2006.01)

(56) References Cited

U.S. PATENT DOCUMENTS

| | | | | |
|---|---|---|---|---|
| 9,905,913 | B2 | 2/2018 | Hung et al. | |
| 2006/0044187 | A1* | 3/2006 | Sager | H01Q 9/0457 343/700 MS |
| 2012/0235866 | A1* | 9/2012 | Kim | H01Q 7/00 343/700 MS |
| 2012/0249383 | A1 | 10/2012 | Hsu et al. | |
| 2014/0139379 | A1* | 5/2014 | Bolin | H01Q 9/06 343/702 |
| 2015/0380820 | A1 | 12/2015 | Wu et al. | |
| 2018/0034134 | A1 | 2/2018 | Dalmia et al. | |
| 2018/0131087 | A1 | 5/2018 | Kim et al. | |
| 2019/0341675 | A1 | 11/2019 | Yamagajo et al. | |

FOREIGN PATENT DOCUMENTS

| | | | |
|---|---|---|---|
| CN | 108232404 | A | 6/2018 |
| CN | 108321497 | A | 7/2018 |
| CN | 207781870 | U | 8/2018 |
| CN | 207782874 | U | 8/2018 |
| CN | 108767499 | A | 11/2018 |
| CN | 109216890 | A | 1/2019 |
| CN | 110380197 | A | 10/2019 |
| CN | 111029725 | A | 4/2020 |
| EP | 3062389 | A1 | 8/2016 |
| JP | 2003243916 | A | 8/2003 |
| KR | 20110008606 | A | 1/2011 |
| KR | 20120117048 | A | 10/2012 |
| WO | 2009019782 | A1 | 2/2009 |

OTHER PUBLICATIONS

First Office Action issued in related Chinese Application No. 201911417159.2, mailed Oct. 28, 2020, 9 pages.

Second Office Action issued in related Chinese Application No. 201911417159.2, mailed Jun. 10, 2021, 8 pages.

Examination Report issued in related Indian Application No. 202227043007, mailed Nov. 11, 2022, 5 pages.

Extended European Search Report issued in related European Application No. 20910215.1, mailed May 8, 2023, 12 pages.

Notice of Reasons for Refusal issued in related Japanese Application No. 2022-539760, mailed Jul. 11, 2023, 10 pages.

Office Action issued in related Korean Application No. 10-2022-7026412, mailed May 18, 2023, 9 pages.

* cited by examiner

ELECTRONIC DEVICE

CROSS-REFERENCE TO RELATED APPLICATIONS

This application is a continuation of International Application No. PCT/CN2020/139906, filed on Dec. 28, 2020, which claims priority to Chinese Patent Application No. 201911417159.2 filed in China on Dec. 31, 2019. The entire contents of each of the above-referenced applications are expressly incorporated herein by reference.

TECHNICAL FIELD

The present disclosure relates to the field of communications technologies, and in particular, to an electronic device.

BACKGROUND

To get a higher screen-to-body ratio, full-screen electronic devices continuously minimize a space for antennas at present. As a result, antennas are getting closer and closer to electromagnetic components. These electromagnetic components can absorb a great quantity of electromagnetic waves, causing lower radiation performance of the antennas. Further, the electromagnetic components generate radio frequency spurious signals when working, which interferes a receiving frequency band of the antennas. A display screen of an electronic device especially brings much influence. In addition, phones with a curved display have emerged and gained popularity in recent years. Beneath the display screen, a large piece of copper foil is usually added for electrostatic protection. But for some reason, the copper foil cannot be grounded. In this case, radiation performance of an antenna is further reduced and radio frequency interference is even stronger because of the display screen and the copper foil.

SUMMARY

Embodiments of the present disclosure provide an electronic device

According to a first aspect, the embodiments of the present disclosure provide an electronic device, including:

- a housing, including a frame;
- an electromagnetic component;
- a ground plate disposed inside the housing;
- a first radiating body disposed inside the housing, where the first radiating body is provided with a feeding point; and
- a second radiating body disposed at a distance from the first radiating body, where a distance between the second radiating body and a first frame of the frame is less than a distance between the first radiating body and the first frame; and
- a minimum distance between the first radiating body and the electromagnetic component is greater than a minimum distance between the second radiating body and the electromagnetic component, and/or a size of a projection area of the first radiating body onto the ground plate is larger than a preset size.

In the embodiments of the present disclosure, the second radiating body is disposed apart from the first radiating body, where the distance between the second radiating body and the first frame of the frame is less than the distance between the first radiating body and the first frame; and the minimum distance between the first radiating body and the electromagnetic component is greater than the minimum distance between the second radiating body and the electromagnetic component, and/or the size of the projection area of the first radiating body onto the ground plate is larger than the preset size. In this way, there can be less antenna attenuation and radio frequency interference caused by an electromagnetic component, for example, a display screen, and higher antenna radiation performance. This also can reduce a discrepancy of antenna performance due to unstable grounding impedance of the electromagnetic component, thereby improving antenna performance in free spaces and in human body models.

BRIEF DESCRIPTION OF DRAWINGS

To describe the technical solutions of the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

REFERENCE SIGNS

1—housing, 11—first frame, 2—display screen, 3—ground plate, 4—feed source, 5—first radiating body, 6—second radiating body, 61—first connection point, and 62—second connection point.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

Common forms of antennas for mobile phones, such as monopoles, inverted-F antennas, planar inverted-F antennas, and loop antennas, cannot effectively mitigate attenuation of antenna radiation and radio frequency interference caused by a display screen. Or, in a case in which a ground plate is added (that is, a grounding plane is added between an antenna and an electromagnetic component) to mitigate antenna attenuation caused by the electromagnetic component, however, a radiation capability of the antenna is in turn impacted by the ground plate. In conventional technologies, common feeding methods include a direct feed and a coupling feed. A direct feed means a manner of feeding in which radio frequency energy is directly connected to an antenna radiating body. A coupling feed means first connecting radio frequency energy to a coupled branch and then forming an insulation space between the coupled branch and a main radiation branch, where the space creates capacitive coupling to transfer the radio frequency energy. The coupled parts are used to implement a coupling feed function. Because a too-small coupling capacitance is not feasible, the space between the coupled parts has to be relatively small. In a conventional technology, there are solutions in which an extension branch is further added to the coupled branch, and the extension branch can generate another high-frequency resonant mode, while the main purpose is to expand a bandwidth of an antenna. Besides, the extension branch is usually not coupled to the main radiation branch. That is, the extension branch works independently. In this case, radiation performance of the extension branch is relatively poor, and how to reduce impacts on components while improving the final radiation performance is not revealed. Therefore, in the embodiments of the present disclosure, an electronic device is provided to mitigate antenna attenuation and radio frequency interference caused by an electromagnetic component, for example, a display screen, and improve antenna radiation performance. This also can reduce a discrepancy of antenna performance due to unstable grounding impedance of the electromagnetic component, thereby improving antenna performance in free spaces and in human body models.

Figure 1:
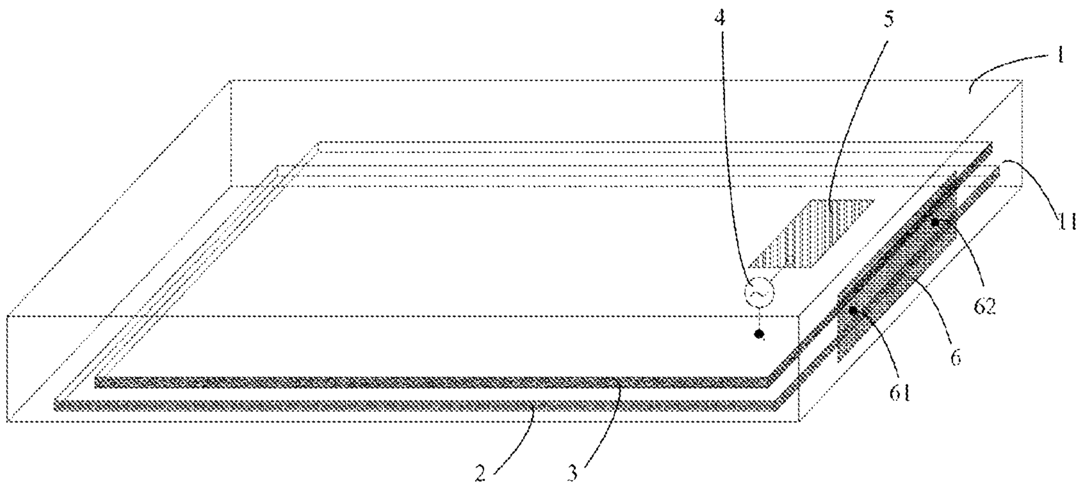
FIG. 1 is a schematic structural diagram of an electronic device according to an embodiment of the present disclosure.

Specifically, as shown in FIG. 1, an embodiment of the present disclosure provides an electronic device, including:

- a housing 1, including a frame;
- an electromagnetic component;
- a ground plate 3 disposed inside the housing 1;
- a first radiating body 5 disposed inside the housing 1, where the first radiating body is provided with a feeding point; and
- a second radiating body 6 disposed apart from the first radiating body 5, where a distance between the second radiating body 6 and a first frame 11 of the frame is less than a distance between the first radiating body 5 and the first frame 11; and
- a minimum distance between the first radiating body 5 and the electromagnetic component is greater than a minimum distance between the second radiating body 6 and the electromagnetic component, and/or a size of a projection area of the first radiating body 5 onto the ground plate 3 is larger than a preset size.

Specifically, the first frame 11 is a frame along a length or width of the first radiating body 5 and the second radiating body 6. The distance between the second radiating body 6 and the first frame 11 is less than the distance between the first radiating body 5 and the first frame 11. That is, the second radiating body 6 is closer to an outer contour of the housing 1 along a length or width of the outer contour of the housing 1 than the first radiating body 5.

Specifically, the first radiating body 5 is a primary radiating body, and the second radiating body 6 is a secondary radiating body. The electromagnetic component is a component that causes antenna attenuation and radio frequency interference. The first radiating body 5 is disposed apart from the second radiating body 6. That is, there is a space between the first radiating body 5 and the second radiating body 6. The space creates capacitive coupling with which a part of energy on an antenna of the first radiating body 5 may be coupled to the second radiating body 6. A specific size of the space may be adjusted in specific conditions.

Further, a value of the capacitive coupling between the first radiating body 5 and the second radiating body 6 is less than a first threshold; and within the target frequency band, a Smith chart of the second radiating body 6 shows no ellipse, circle, or broken line, or a diameter of a minimum circle encompassing an impedance curve in the Smith chart of the second radiating body 6 is less than ⅕ of a diameter of a minimum circle encompassing an impedance curve in a Smith chart of the first radiating body 5.

Specifically, if the value of the capacitive coupling between the first radiating body 5 and the second radiating body 6 is less than the first threshold (where specifically, the first threshold may be determined in experiments based on different antenna structures), it is required that within the target frequency band, no ellipse, circle, or broken line indicating an impedance of the second radiating body 6 should be generated, or a diameter of a generated ellipse or circle indicating the impedance should be less than a fifth of a diameter of an ellipse, circle, semi-ellipse, or semi-circle indicating an impedance of the first radiating body 5, an antenna standing wave ratio graph in an optimal case shows a specific standing wave featuring a narrow band or a small convex, or merely featuring an unsmooth curve (for example, a broken line), and the standing wave may be at any position within the target frequency band or within the non-target frequency band. This is not specifically limited.

Figure 2:
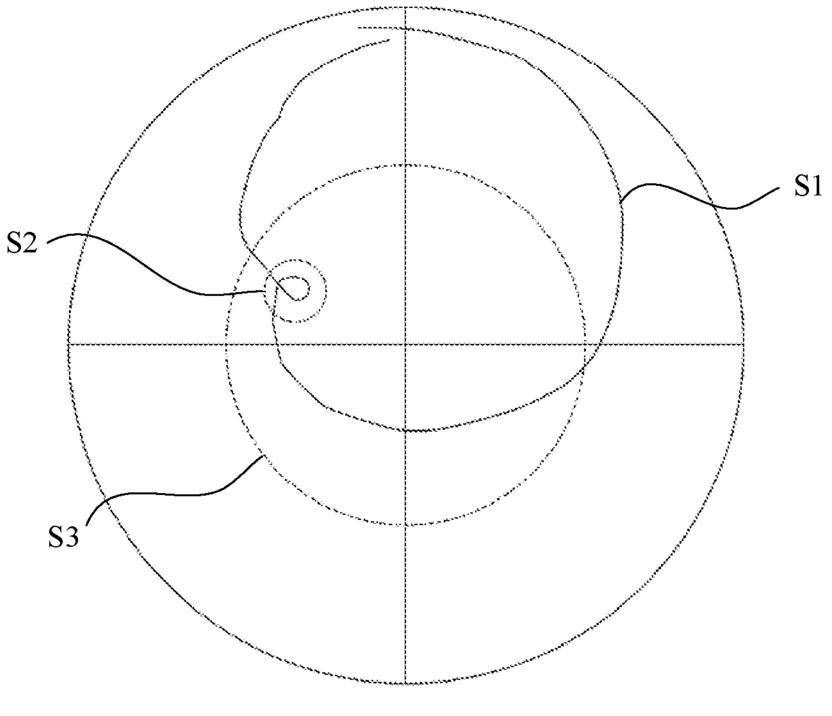
FIG. 2 is a first schematic diagram of an antenna impedance at a feed source according to an embodiment of the present disclosure.

Specifically, for example, as shown in FIG. 2, a solid-line part encompassed by a dotted-line circle S2 is an impedance curve of the second radiating body 6. The dotted-line circle S2 is shrunk to a size that is enough to encompass the impedance curve of the second radiating body 6, that is, there is a tangent point between the shrunk dotted-line circle S2 and the impedance curve (to be specific, there are at least three points of intersection between the shrunk dotted-line circle S2 and the impedance curve, and the impedance curve is within the minimum circle). In other words, the shrunk dotted-line circle S2 is the minimum circle that encompasses the impedance curve in the Smith chart of the second radiating body 6, where the impedance curve of the second radiating body 6 is always within the minimum circle. Similarly, a shrunk circle (not shown) encompassing a curve S1 is just big enough to surround the entire curve S1. To be specific, the shrunk circle encompassing the curve S1 is a minimum circle that encompasses an impedance curve in the Smith chart of the first radiating body 5.

Further, the value of the capacitive coupling between the first radiating body 5 and the second radiating body 6 is greater than or equal to the first threshold; and within a non-target frequency band, the diameter of the minimum circle encompassing the impedance curve in the Smith chart of the second radiating body 6 is greater than ⅕ of the diameter of the minimum circle encompassing the impedance curve in the Smith chart of the first radiating body 5.

Specifically, if the capacitive coupling between the first radiating body 5 and the second radiating body 6 is greater than the first threshold, it is required that within the non-target frequency band, the impedance curve generated by the second radiating body 6 in a shape of an ellipse, a circle, a quasi-circle, or the like should be encompassed in a first circle. The first circle is just big enough to surround the impedance curve generated by the second radiating body 6 within the non-target frequency band. Within the non-target frequency band, the impedance curve generated by the first radiating body 5 in the Smith chart in a shape of an ellipse, a circle, a semi-ellipse, a semi-circle, or another quasi-circle is encompassed in a second circle. The impedance curve can be surrounded by the second circle. A diameter of the first circle is greater than a fifth of a diameter of the second circle. An antenna standing wave ratio graph in an optimal case features a wide-band standing wave, and the standing wave may be at any position within the non-target frequency band. This is not specifically limited.

Figure 4:
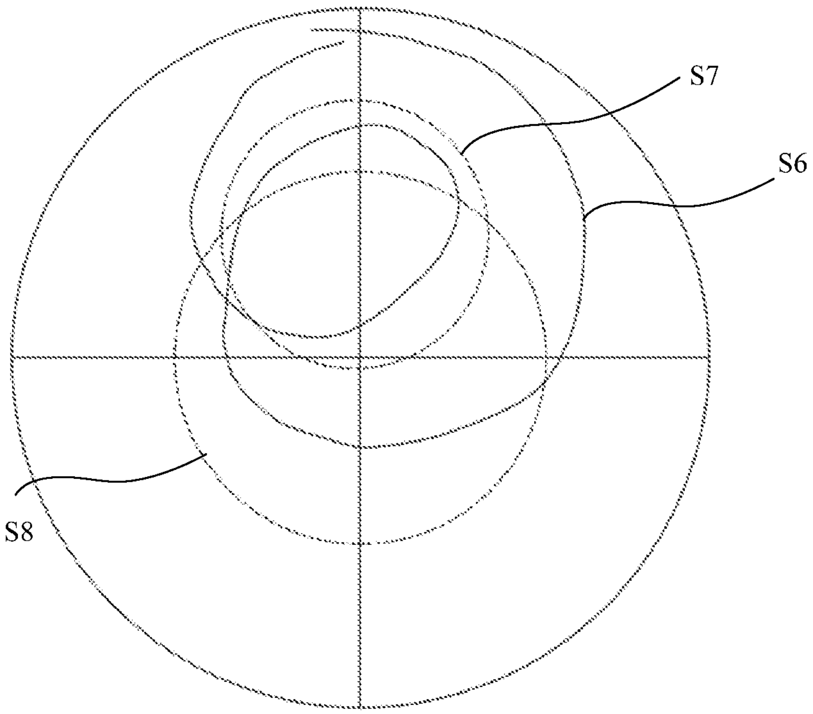
FIG. 4 is a second schematic diagram of an antenna impedance at a feed source according to an embodiment of the present disclosure.

Specifically, for example, as shown in FIG. 4, a solid-line part encompassed by a dotted-line circle S7 is an impedance curve of the second radiating body 6. The dotted-line circle S7 is shrunk to be just enough to surround the impedance curve of the second radiating body 6, that is, there is a tangent point between the shrunk dotted-line circle S7 and the impedance curve (to be specific, there are at least three points of contact between the shrunk dotted-line circle S7 and the impedance curve). In other words, the shrunk dotted-line circle S7 is the minimum circle that surrounds the impedance curve in the Smith chart of the second radiating body 6. Similarly, a shrunk circle (not shown) encompassing a curve S6 is just big enough to surround the entire curve S6. To be specific, the shrunk circle encompassing the curve S6 is a minimum circle that encompasses an impedance curve in the Smith chart of the first radiating body 5.

Specifically, a coupling relationship between the first radiating body 5 and the second radiating body 6 needs to satisfy one of the following several conditions:

Condition 1: There is a big space, for example, greater than 3 mm, between the first radiating body 5 and the second radiating body 6. In this case, the capacitive coupling between the first radiating body 5 and the second radiating body 6 is relatively weak, the first radiating body 5 generates a resonant mode within the target frequency band and has a main current path, and the second radiating body 6 may generate a very weak resonant mode or has no obvious resonant mode within the target frequency band or the non-target frequency band, in which there is weak resonance and a relatively weak current path, because the big space of coupling leads to not much antenna energy through the coupling. As shown in FIG. 2, an antenna impedance at the feed source 4 is represented by S1, and a specific position of the antenna impedance S1 in FIG. 2 may vary greatly with different forms of the antenna which are not specifically limited. In FIG. 2, within the target frequency band or the non-target frequency band, the second radiating body 6 has a specific impedance represented by a very small loop (for example, a circle or an ellipse), or no circle but an unsmooth curve (for example, a broken line), and a specific position of the specific impedance, for example, a curve S2 in FIG. 2, may vary greatly with different forms of the antenna which are not specifically limited. S3 is an impedance circle when a standing wave ratio is 3.

Figure 3:
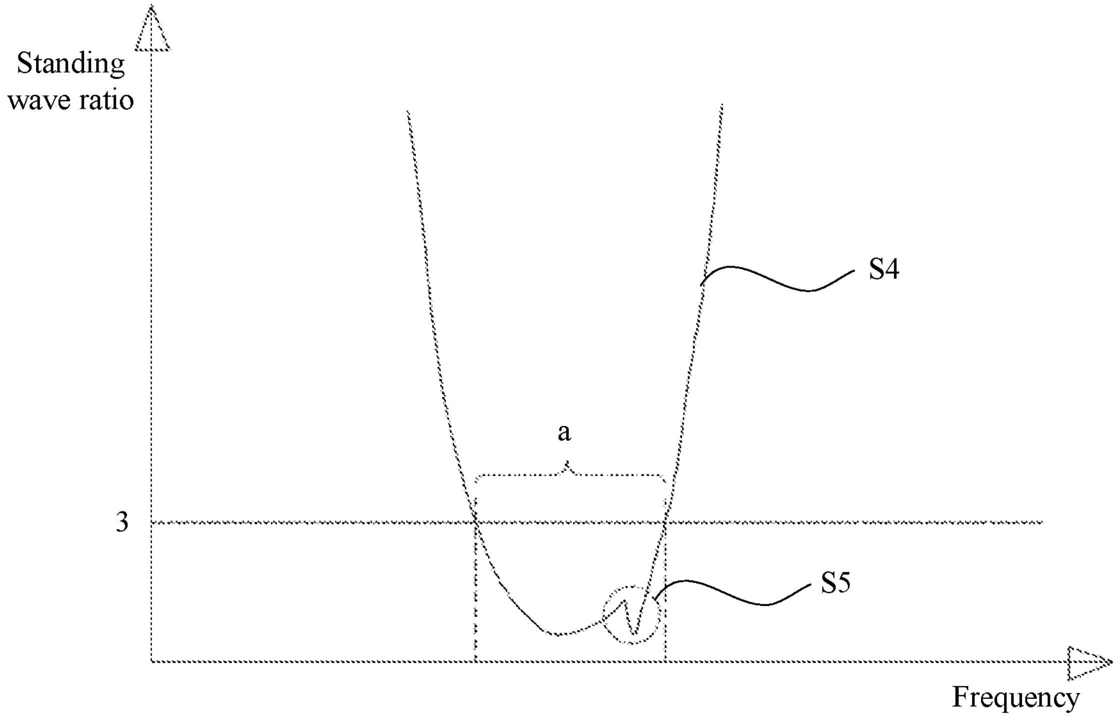
FIG. 3 is a first schematic diagram of an antenna standing wave ratio at a feed source according to an embodiment of the present disclosure.

As shown in FIG. 3, a is the target frequency band, the curve S1 is represented by S4 in the corresponding antenna standing wave ratio graph, in the corresponding antenna standing wave ratio graph, the curve S2 is represented by a specific standing wave featuring a narrow band or a small convex, or merely featuring an unsmooth curve (for example, a broken line), and the specific standing wave, for example, a curve S5 in FIG. 3, may be at any position within the target frequency band or the non-target frequency band, which is not specifically limited. Either within the target frequency band or the non-target frequency band, the specific standing wave does not mean much to expanding an antenna bandwidth due to a too narrow band. In addition, when the very weak resonant mode generated by the second radiating body 6 goes from the non-target frequency band to the target frequency band, an antenna performance is improved.

Condition 2: There is a relatively small space, for example, less than or equal to 3 mm, between the first radiating body 5 and the second radiating body 6. In this case, the capacitive coupling between the first radiating body 5 and the second radiating body 6 is relatively strong. In this case, the first radiating body 5 generates a strong resonant mode within the target frequency band and has a main current path, and a length of the second radiating body 6 needs to be adjusted, so that the second radiating body 6 does not resonate within the target frequency band, but has strong resonance within the non-target frequency band. In this case, the second radiating body 6 does not resonate within the target frequency band and still has a relatively weak current path. Although a small coupling space strengthens the coupling, for a coupling feed in the conventional technology, the second radiating body 6 obtains not much energy within the target frequency band as before. In this case, an antenna impedance at the feed source 4 is represented by S6 in FIG. 4, and a specific position of the antenna impedance S6 in FIG. 4 may vary greatly with different forms of the antenna which are not specifically limited. In FIG. 4, within the non-target frequency band, the second radiating body 6 is represented by a large loop (for example, a circle or an ellipse), for example, a curve S7 in FIG. 4, whose specific position in FIG. 4 may vary greatly with different forms of the antenna which are not specifically limited. S8 is an impedance circle when a standing wave ratio is equal to 3.

Figure 5:
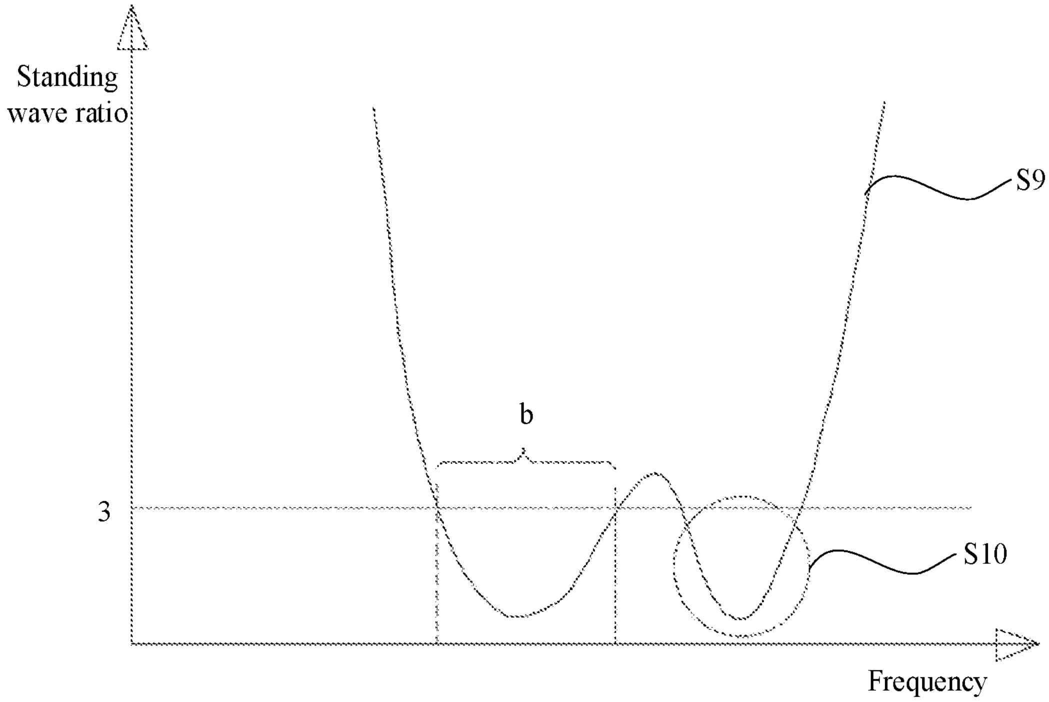
FIG. 5 is a second schematic diagram of an antenna standing wave ratio at a feed source according to an embodiment of the present disclosure.

As shown in FIG. 5, b is the target frequency band, the curve S6 is represented by S9 in the corresponding antenna standing wave ratio graph, in the corresponding antenna standing wave ratio graph, the curve S7 is represented by a standing wave featuring a very wide band, and the wide-band standing wave, for example, a curve S10 in FIG. 5, may be at any position within the non-target frequency band, which is not specifically limited. In this case, the curve S10 as shown in FIG. 5 can bring an effect of expanding an antenna bandwidth; and can mitigate antenna energy attenuation and radio frequency interference within the target frequency band caused by the electromagnetic component, and improve antenna radiation performance. When the resonant mode of the second radiating body 6 is a ¼ wavelength fundamental mode (for example, an L-shaped mode) or a 2/4 wavelength fundamental mode (for example, a loop-shaped mode) and a resonant frequency of the fundamental mode is a little higher than that of the first radiating body 5, the best final antenna performance can be achieved.

Further, as shown in FIG. 1, the preset size may be ⅓ of a size of the ground plate 3. The preset size may be set based on specific conditions. This is not specifically limited herein.

In the embodiments of the present disclosure, the second radiating body 6 is disposed apart from the first radiating body 5, where the distance between the second radiating body 6 and the first frame 11 of the frame is less than the distance between the first radiating body 5 and the first frame 11; and the minimum distance between the first radiating body 5 and the electromagnetic component is greater than the minimum distance between the second radiating body 6 and the electromagnetic component, and/or the size of the projection area of the first radiating body 5 onto the ground plate 3 is larger than the preset size. There can be less antenna attenuation and radio frequency interference caused by an electromagnetic component, for example, a display screen, and higher antenna radiation performance, thereby improving antenna performance in free spaces and in human body models.

Further, the electromagnetic component may be a display screen 2, a battery, a Near Field Communication (NFC) antenna, a loudspeaker, a camera, a receiver, a universal serial bus interface, a side button, or the like.

A thermally conductive graphite sheet in the battery and a connection circuit form an electromagnetic component. A ferrite in the NFC antenna and a coil form an electromagnetic component. The side button is metallic, and the metal frame button and the connection circuit form an electromagnetic component.

Specifically, the display screen 2 may be a Liquid Crystal Display (LCD), an Organic Light-Emitting Diode (OLED), a flexible display screen, or the like that is commonly used in the industry. This is not specifically limited. The LCD may have an iron sheet at the back to protect a luminous plate. The flexible display screen may further have a large piece of suspended copper foil at the back. The copper foil is usually used for Electro-Static Discharge (ESD) protection. The iron sheet at the back of the LCD or the copper foil at the back of the flexible display screen cannot, for some reason, be connected to the ground plate 3 for grounding, and in this case, attenuation and interference brought about by the display screen with the iron sheet or the copper foil will be even more serious. When the iron sheet or the copper foil is grounded but an impedance is unstable, compared with a conventional solution, the embodiments of the present disclosure help to considerably reduce an impact on antenna performance either with grounding or not. Therefore, there is a lower requirement on a ground impedance, that is, engineering implementation becomes less difficult.

Further, the first radiating body 5 generates a first current within the target frequency band, the second radiating body 6 generates a second current within the target frequency band, and a maximum value of the first current is greater than a maximum value of the second current.

Specifically, the first radiating body 5 generates a resonant mode within the target frequency band (that is set based on a specific condition) and has a main current path (that is, the first radiating body 5 generates a first current within the target frequency band), and the second radiating body 6 does not generate a resonant mode or generates a weak resonant mode within the target frequency band (that is, the second radiating body 6 generates a second current within the target frequency band), where a peak value of the first current is greater than a peak value of the second current. In terms of theory, compared with a conventional method in which the second radiating body 6 is with a coupling feed, the embodiments of the present disclosure show energy on the second radiating body 6 that goes down considerably and energy on the first radiating body 5 that goes up (that is, an overall antenna energy is farther than the electromagnetic component), so that attenuation by absorption of the electromagnetic component is reduced. Further, the second radiating body 6 can guide radiation of antenna energy on the first radiating body 5, thereby improving the radiation. It should be noted that a resonant frequency of the first radiating body 5 is obviously impacted because there is a part of energy on the second radiating body 6, so that finally, both radiating bodies play a role in the radiation together, thereby mitigating antenna energy attenuation and radio frequency interference caused by an electromagnetic component and improving antenna radiation performance. Eventually, antenna performance in free spaces and in human body models is improved.

Specifically, the resonant mode is an inherent feature of an antenna structure. Each resonant mode has a specific resonant frequency and specific current distribution, and signal excitation can change a level of excitation of the resonant mode. A strong resonant mode refers to a resonant mode with a high level of excitation which specifically can be indicated by a minimum antenna standing wave ratio that is less than 4 of the resonant mode within the target frequency band. A weak resonant mode refers to a resonant mode with a low level of excitation which specifically can be indicated by a minimum antenna standing wave ratio that is greater than 4 of the resonant mode within the target frequency band. Generating no resonant mode means that a resonant mode is not excited or is with an extremely low level of excitation which specifically can be indicated by a minimum antenna standing wave ratio that is greater than 10 of the resonant mode within the target frequency band.

In addition, as shown in FIG. 1, the electronic device may further include:

a feed source 4, where one end of the feed source 4 is connected to the feeding point, and the other end is connected to the ground plate 3. Further, the electronic device may further include:

an antenna matching circuit, where the first radiating body 5 is connected to the feed source 4 via the antenna matching circuit.

Specifically, during settings of the antenna matching circuit, the antenna impedance may be matched to an impedance of the feed source 4. A specific structure of the antenna matching circuit is not specifically limited herein.

Further, as shown in FIG. 1, the second radiating body 6 is a metal conductor disposed on the first frame 11, and at least one connection points on the second radiating body 6 connected to the ground plate 3.

Specifically, as shown in FIG. 1, the second radiating body 6 may be a metal conductor whose first connection point 61 and/or second connection point 62 are/is connected to the ground plate 3. When both the first connection point 61 and the second connection point 62 are connected to the ground plate 3, the second radiating body 6 is a loop-shaped or F-shaped metal conductor. This is not specifically limited herein.

Further, the second radiating body 6 may be the first frame 11, and the first frame 11 is metallic.

Specifically, when the second radiating body 6 is connected to the ground plate 3 by using the first connection point 61 and the second connection point 62, a specific structure of the electronic device may be that a closed slot antenna is formed between the metal frame (as the second radiating body 6) and the ground plate 3. The first radiating body 5 and the second radiating body 6 both are made of conductive materials, and may be a flexible circuit board inside or on an outer surface of the housing 1 of the electronic device, a stainless steel sheet, a magnesium/aluminum alloy, a metal frame on a contour, or the like. This is not specifically limited. In addition, the resonant modes of the first radiating body 5 and the second radiating body 6 may each be a fundamental mode (with ¼ or 2/4 wavelength) or a high order mode (with a wavelength, for example, 2/4, ¾, 4/4, 5/4, . . . , and n/4), for example, 2/3/4/5, . . . , and n.

Further, when a resonant mode of the second radiating body 6 is a ¼ wavelength fundamental mode (for example, an L-shaped mode) or a 2/4 wavelength fundamental mode (for example, a loop-shaped mode), and a resonant frequency in the fundamental mode of the second radiating body 6 is higher than a resonant frequency in a fundamental mode of the first radiating body 5, the best final antenna performance is achieved.

Further, the second radiating body 6 may be a suspended conductor disposed inside the housing 1.

Specifically, the second radiating body 6 may be a suspended conductor. The suspended conductor may be a conductor carried by an insulating medium (for example, an insulating cement). Alternatively, the second radiating body 6 may be an L-shaped conductor with a longer side and a shorter side, where the shorter side may be connected to the feed source 4 to support suspension of the longer side, so that radiation is further improved and the number of connection points is further decreased, thereby lowering difficulties of engineering implementation.

Further, the first radiating body 5 may be a monopole, an inverted-F antenna, a planar inverted-F antenna, a loop antenna, or the like.

The following descriptions are provided with reference to a specific embodiment:

The first radiating body 5 is on an interior of a shorter side of the frame of the housing 1, and adopts a commonly-used inverted-F antenna. A size of a projection area of the first radiating body 5 onto the ground plate 3 is larger than ⅓ of a size of the ground plate 3. The inverted-F antenna has one feeding point and one grounding point, where the feeding point is connected to the feed source 4, and the grounding point is connected to the ground plate 3. The first radiating body 5 uses flexible circuit board materials commonly used in the industry whose length and width are 13 mm and 4 mm respectively. A distance between the first radiating body 5 and the ground plate 3 is 2 mm in a thickness-wise direction of an electric device, and a minimum distance between the first radiating body 5 and an edge of a display screen is 1 mm in a lengthwise direction of the electric device. The display screen 2 is right under the ground plate 3, and is a commonly seen flexible display screen with a suspended copper foil at the back. The suspended copper foil is not, for some reason, connected to the ground plate 3, hence the copper foil is in suspension. A thickness of the display screen 2 is 0.7 mm, and there is a whole piece of foam insulation of 0.3 mm between the display screen 2 and the copper foil at the back. There is another whole piece of foam insulation of 0.3 mm between the copper foil at the back and the ground plate 3. The second radiating body 6 is on an outermost surface of the shorter side of the frame of the housing 1, and directly uses an exposed metal frame for an antenna. A thickness of the metal frame is 1 mm. There is a space between an inner side of the metal frame and the display screen 2, and the space is 0.7 mm. A length of the ground plate 3 is 1 mm shorter than the display screen 2 in the lengthwise direction of the electric device, and in other words, a distance between the inner side of the metal frame and the ground plate 3 is only 1.7 mm. The second connection point 62 of the second radiating body 6 is directly connected to the ground plate 3 via the metal frame for implementing grounding. There is one space near the first connection point 61 on the metal frame. A part of the metal frame at one side of the gap is grounded via the first connection point 61 and/or the second connection point 62, and another part of the metal frame at the other side of the gap is directly grounded, so that a conductive path of the metal frame is formed between the gap near the first connection point 61 and the second connection point 62, where a length, width, thickness of the metal frame having the conductive path are 9.5 mm, 4 mm, and 1 mm respectively. In a same plane in the lengthwise direction of the electric device, the first radiating body 5 and the second radiating body 6 each have a protruding part, and a space between the protruding parts is around 1.2 mm. In this case, condition 2 is satisfied. The first radiating body 5 generates a resonant mode (that is with ¼ wavelength resonance) and has a main current path within the target frequency band (2.5 GHz to 2.69 GHz), and the second radiating body 6 does not resonate within the target frequency band (2.5 GHz to 2.69 GHz). Although with no resonance, the second radiating body 6 has a relatively weak current path. Because distributed energy on the second radiating body 6 is relatively small, there is relatively low attenuation and radio frequency interference due to absorption of the display screen. Further, the second radiating body 6 can guide radiation of antenna energy on the first radiating body 5, thereby improving the radiation and finally improving antenna performance. However, the second radiating body 6 generates a resonant mode (that is with ¼ wavelength resonance) and has a main current path within the non-target frequency band (3 GHz to 3.3 GHz), which is strong resonance in which antenna energy on the second radiating body 6 increases sharply, and in this case, attenuation and radio frequency interference due to absorption of the display screen also get much higher rapidly. Although the second radiating body 6 can guide radiation of the antenna energy on the first radiating body 5, an impact of the display screen becomes huge very quickly, and antenna performance is still lower than that within the target frequency band (2.5 GHz to 2.69 GHz). In an example of A and B in FIG. 6, B is 2 dB lower than A on average. The foregoing numbers are merely examples but not specific limitations.

Figure 6:
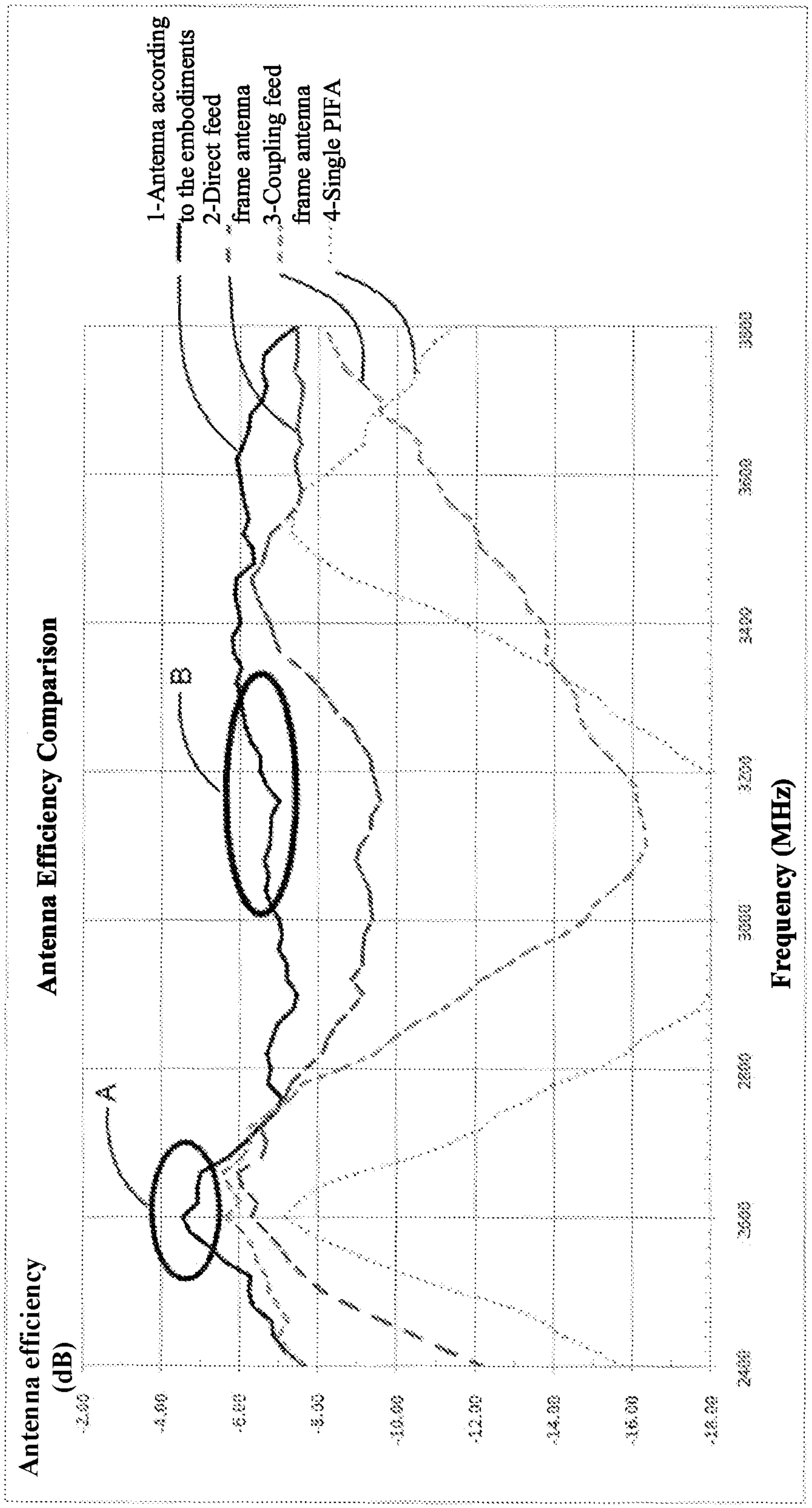
FIG. 6 is a schematic diagram of comparing efficiencies of antennas in different forms according to an embodiment of the present disclosure.

For example, this is shown in FIG. 6, in a space condition of the electronic device, the target frequency band is 2.5 GHz to 2.65 GHz. A curve 1 is an antenna efficiency curve according to the embodiments, and a curve 2 represents efficiency of a coupling feed frame antenna when a length of the first radiating body 5 is decreased based on the embodiments, so that the first radiating body 5 does not resonate within the target frequency band, but only implements energy transfer through the coupling feed, and a grounding position of the second connection point 62 is changed, to increase a length of the space to achieve ¼ wavelength resonance within the target frequency band. In this case, the second radiating body 6 generates a resonant mode, and a resonant frequency goes within the target frequency band. A curve 3 represents efficiency of a feed frame antenna when the first radiating body 5 is removed based on the embodiments. Then, the second radiating body 6 is used as a primary radiating body, and is directly connected to the feed source 4 by connecting the first connection point 61 and a match circuit of 0.5 p and 5 nH in series, that is, implements a direct feed; and change the grounding position of the second connection point 62, to increase the length of the space to achieve ¼ wavelength resonance within the target frequency band. In this case, the second radiating body 6 generates a resonant mode, and a resonant frequency goes within the target frequency band. A curve 4 represents efficiency of a single planar inverted-F antenna, and means that a radiation effect of the second radiating body 6 is impacted through sound multipoint grounding based on the embodiments, and further, the first radiating body 5 needs to increase a length of an antenna to achieve ¼ wavelength resonance within the target frequency band. Through the comparison of antenna efficiencies, it can be learned that within the target frequency band 2.5 GHz to 2.65 GHz, the curve 1 is above the curve 2 that is above the curve 3 that is above the curve 4. In addition, in the experiment, attenuation degrees caused by a display screen (in a contrast between keeping and removing the "screen and the copper foil at the back") within the target frequency band 2.5 GHz to 2.65 GHz, the curve 4 (indicating 0.7 dB of screen-caused attenuation) is below the curve 1 (indicating 1.2 dB of screen-caused attenuation) that is below the curve 2 (indicating 2 dB of screen-caused attenuation) that is equal to the curve 3 (indicating 2 dB of screen-caused attenuation). It should be noted that although 0.7 dB of screen-caused attenuation indicated by the curve 4 is the smallest value, the antenna efficiency turns out to be the lowest because an antenna space is far from an edge of a mobile terminal and a radiation capability is poor. In comparison with the curve 1, it can be learned that the second radiating body 6 can effectively improve radiation. In addition, although the curve 2 indicates a little higher antenna performance than that is indicated by the curve 3, the screen-caused attenuation degrees corresponding to the curves are the same, namely, 2 dB. The improvement of antenna performance is merely brought by a difference between the coupling feed and the direct feed. However, in the embodiments, the first radiating body 5 and the second radiating body 6 are both required for radiation, so that reducing screen-caused attenuation and improving radiation are implemented together, thereby achieving optimal antenna performance. In FIG. 6, an antenna efficiency is in dB (where efficiency conversion from dB to percentage is that an antenna efficiency in dB is equal to 10 times lg (as an antenna efficiency in percentage)). Another type of display screen 2 (with no copper foil or iron sheet at the back) can achieve the same effects as the flexible display screen. Details are not provided herein again.

In the embodiments of the present disclosure compare with the conventional technology, through coupled radiation, that is, by coupling the first radiating body 5 to the second radiating body 6 for improving radiation, both the first radiating body 5 and the second radiating body 6 play a role in the radiation together, there may be a plurality of antenna structure forms for the first radiating body 5 and the second radiating body 6, and a resonant mode is with ¼ or more wavelength. In addition, by setting relative relationships between the first radiating body 5, the second radiating body 6, the electromagnetic component, and the frame, the second radiating body 6 closer to the electromagnetic component does not resonate or is with weak resonance within the target frequency band, to reduce an impact of the electromagnetic component and improve radiation through the coupled radiation, thereby improving antenna performance.

In conclusion, in the embodiments of the present disclosure, the second radiating body 6 is disposed apart from the first radiating body 5, where the distance between the second radiating body 6 and the first frame 11 of the frame is less than the distance between the first radiating body 5 and the first frame 11; and the minimum distance between the first radiating body 5 and the electromagnetic component is greater than the minimum distance between the second radiating body 6 and the electromagnetic component, and/or the size of the projection area of the first radiating body 5 onto the ground plate 3 is larger than the preset size. There can be less antenna attenuation and radio frequency interference caused by an electromagnetic component, for example, a display screen, and higher antenna radiation performance. This also can reduce a discrepancy of antenna performance due to unstable grounding impedance of the electromagnetic component, thereby improving antenna performance in free spaces and in human body models.

Each embodiment in this specification is described in a progressive manner, each embodiment focuses on the difference from other embodiments, and the same and similar parts between the embodiments may refer to each other.

Although embodiments of the present disclosure have been described, those skilled in the art may make additional changes and modifications to these embodiments once they learn the basic inventive concept. Therefore, the following claims are intended to be construed as to include the embodiments and all changes and modifications falling within the scope of the present disclosure.

Finally, it should be further noted that, in this specification, relationship terms such as first and second are only used to distinguish an entity or operation from another entity or operation, but do not necessarily require or imply that there is any actual relationship or order between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. In absence of more constraints, an element preceded by "includes a . . . " does not preclude the existence of other identical elements in the process, method, article, or terminal device that includes the element.

The above embodiments are embodiments of the present disclosure. It should be noted that, within the technical concept of the present disclosure, those ordinarily skilled in the art can make various improvements and modifications, which shall all fall within the protective scope of the present disclosure.

The invention claimed is:

1. An electronic device, comprising:

a housing, comprising a frame;

an electromagnetic component, comprising a display screen;

a first radiating body disposed inside the housing, wherein the first radiating body is provided with a feeding point;

a ground plate disposed inside the housing, wherein the ground plate is disposed between the electromagnetic component and the first radiating body; and a second radiating body disposed apart from the first radiating body, wherein:

a first distance between the second radiating body and the frame is less than a second distance between the first radiating body and the frame; and a first minimum distance between the first radiating body and the electromagnetic component is greater than a second minimum distance between the second radiating body and the electromagnetic component, wherein the first radiating body is capacitively coupled to the second radiating body, and wherein the first radiation body is an inverted-F antenna or a loop antenna.

2. The electronic device according to claim 1, wherein a resonant mode of the second radiating body is a ¼ wavelength fundamental mode or a ²⁄₄ wavelength fundamental mode, and a resonant frequency in the fundamental mode of the second radiating body is higher than a resonant frequency in a fundamental mode of the first radiating body.

3. The electronic device according to claim 1, wherein:

the first radiating body generates a first current within a target frequency band, the second radiating body generates a second current within the target frequency band, and a maximum value of the first current is greater than a maximum value of the second current.

4. The electronic device according to claim 3, wherein:

a first value of capacitive coupling between the first radiating body and the second radiating body is less than a first threshold; and within the target frequency band, a Smith chart of the second radiating body shows no ellipse, circle, or broken line, or a diameter of a minimum circle encompassing an impedance curve in the Smith chart of the second radiating body is less than ⅕ of a diameter of a minimum circle encompassing an impedance curve in a Smith chart of the first radiating body.

5. The electronic device according to claim 4, wherein:

a second value of capacitive coupling between the first radiating body and the second radiating body is greater than or equal to the first threshold; and within a non-target frequency band, the diameter of the minimum circle encompassing the impedance curve in the Smith chart of the second radiating body is greater than ⅕ of the diameter of the minimum circle encompassing the impedance curve in the Smith chart of the first radiating body.

6. The electronic device according to claim 1, wherein the preset size is ⅓ of the size of the ground plate.

7. The electronic device according to claim 1, further comprising:

a feed source, wherein one end of the feed source is connected to the feeding point, and the other end is connected to the ground plate.

8. The electronic device according to claim 1, wherein the second radiating body is a metal conductor disposed on the frame, and at least one connection point on the second radiating body is connected to the ground plate.

9. The electronic device according to claim 1, wherein the second radiating body is the frame, and the frame is metallic.

10. The electronic device according to claim 1, wherein the second radiating body is a suspended conductor disposed inside the housing.

* * * * *